April 1, 1930. J. W. TURNER ET AL 1,753,099
SHOCK ABSORBING DEVICE FOR MECHANICALLY PROPELLED VEHICLES
Filed Sept. 10, 1927
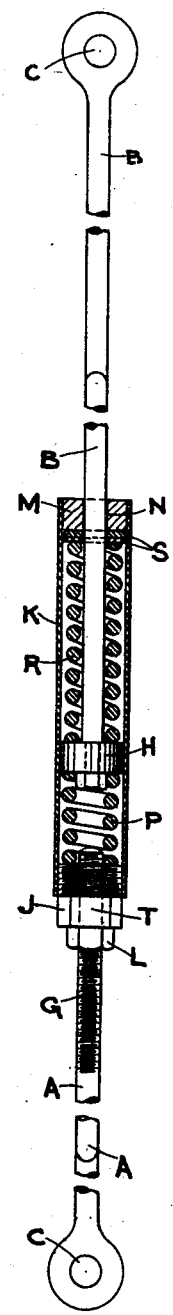
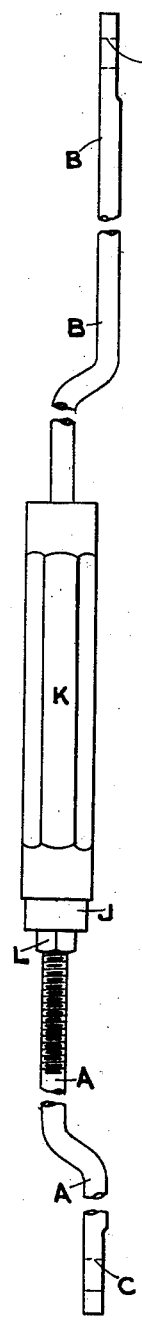
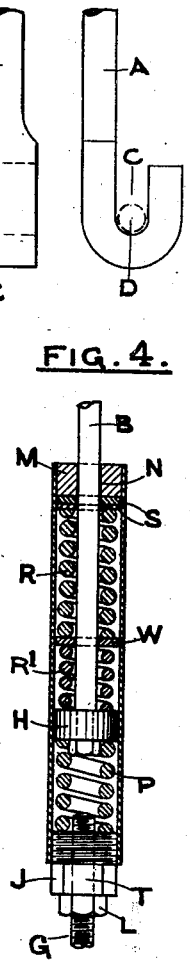
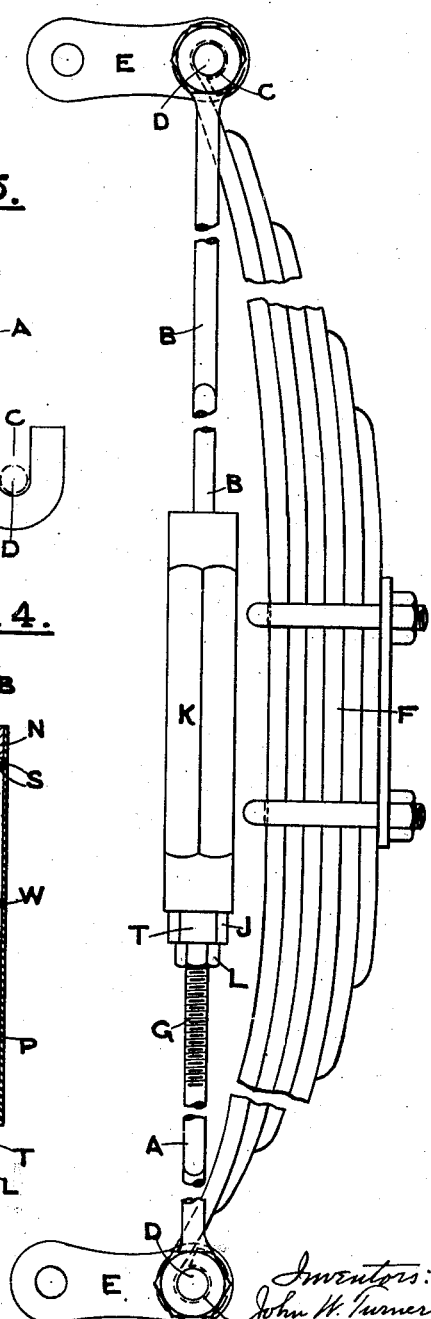

Patented Apr. 1, 1930

1,753,099

UNITED STATES PATENT OFFICE

JOHN WILLIAM TURNER, HARVEY WOOD, AND EDGAR MANN, OF HALIFAX, ENGLAND

SHOCK-ABSORBING DEVICE FOR MECHANICALLY-PROPELLED VEHICLES

Application filed September 10, 1927, Serial No. 218,748, and in Great Britain September 23, 1926.

This invention relates to the spring suspension of mechanically propelled vehicles of the kind comprising a main spring and an auxiliary spring or springs connected with the ends of the main spring the tension of which is adjusted by means of nuts, whereby all additional strains upon the said main spring caused by loads which are greater than the normal will be taken by auxiliary springs in one or both directions of its movement.

The object of the present invention is an improved construction of such auxiliary device and the arrangement of a spring or springs within the aforesaid cylindrical casing, the tension rods connecting the auxiliary spring device with the shackles or shackle pins to which the ends of the main spring are attached, and in the method of and means for adjusting the tension put upon the auxiliary spring or springs.

The improved shock absorbing device aforesaid comprises essentially two steel rods of a suitable length and thickness one end of each rod being adapted to hinge upon the shackle pins by which the leaf springs are mounted upon the vehicle, the opposite end of one rod has a screw-thread thereon and the corresponding end of the other rod has a collar or piston secured thereon. The rod with the screw-thread screws into one end of a cylindrical casing while the other rod is adapted to slide in or out of the opposite end thereof, and one or more springs may be placed thereon between the aforesaid piston and one end of the cylinder, and if desired, a further spring may be fitted between the piston and the opposite end of said cylinder whereby the auxiliary device may take the additional strain put upon the main spring in one or both directions of its movement. The internally screwed plug closing this end of the cylinder or casing projects a suitable distance, is provided with opposing flats thereon, and is adapted to engage or be engaged by a suitable lock-nut also screwing upon the corresponding rod.

We attain these objects by the means illustrated in the accompanying drawing, in which:—

Fig. 1 is a sectional side elevation of the improved device hinging at each end upon the shackle pin or pins upon which are mounted the customary leaf springs of mechanically propelled vehicles.

Fig. 2 is a plan view of the device shown at Fig. 1.

Fig. 3 is a side elevation of Fig. 1 showing the same mounted upon the shackle pins connecting the leaf spring to the vehicle chassis and adapted to restrain the latter spring in both its movements.

Fig. 4 is a sectional elevation showing a modification of the resilient means operating in conjunction with the aforesaid steel rods, adapted to restrain the vehicle spring in both its movements.

Fig. 5 shows elevation and plan of a modification of the ends of the steel tension rods adapted to hook on to the shackle pins.

Similar letters refer to similar parts throughout the several views.

Referring to Figs. 1, 2 and 3 of the drawing:—The steel rods A, B, have an eyelet or hook C or any other suitable means at one end, adapted to hinge upon or engage the shackle pin D of the shackle E securing the spring F to the chassis of the vehicle.

One of the said tension rods A has a screw-thread G formed thereon, the other rod B having a collar or piston H secured to the corresponding end. The rod A is adapted to screw into a bush or plug J screwed into the corresponding end of a suitable cylinder or barrel K adapted to enclose and protect resilient means contained therein. A lock-nut L screwing upon the part G is adapted to engage the plug J for the purpose of preventing any variation of the adjustment of the restraint placed upon the spring F. A further plug M is screwed into the opposite end of the barrel K provided with a bore N adapted to allow the rod B to slide freely therein in either direction.

The barrel K is adapted to receive two or more coiled springs P, R, the spring R surrounds the rod B between the piston H and suitable washers S abutting upon the plug M and is adapted to serve as a compression spring for the purpose of exercising a restraint upon the spring F during any tendency of the latter to straighten out under compression from any cause whatever. The spring P is adapted to serve as a buffer spring for the purpose of absorbing the expansion movement of the said springs F and R.

The spring F may be suitably adjusted or stiffened by first slackening back the locknut L and subsequently turning the barrel K which is preferably flat sided for this purpose, by gripping it by hand, or, by means of a spanner applied to flats T formed upon the plug J, until the plug J engages the nut L when it becomes locked, thereby fixing the adjustment.

Upon screwing or turning the barrel in the opposite direction the latter is adapted to leave the nut L to the desired extent, increasing the distance between the shackle ends of the tension rods, and to fix this adjustment the nut L is again screwed or tightened up against the plug J. By continuing this reverse movement of the casing the auxiliary device may be put completely out of action.

In a further modification (see Fig. 4) two springs R, R¹, of different strengths may be positioned upon the piston or plain rod B with an intervening washer W, the weaker spring R¹ being adapted to be engaged by the piston H whereby shocks of average or normal extent may be absorbed thereby, but where severe shocks are imparted or sustained the overcoming of the spring R¹ is met by the spring R, which is adapted to serve as an auxiliary to R¹ for wholly absorbing the same.

Suitable means may be provided in or upon the cylinder for efficiently lubricating the piston, piston rod, springs and other movable parts, as desired.

What we claim as our invention, and desire to secure by Letters Patent is:—

1. A vehicle shock absorber comprising, in combination, a leaf spring, two rods, respectively, connected to opposite ends of the leaf spring, one of said rods having a threaded end portion, and the other having a plunger connected thereto, a casing or barrel having one end engaging said threaded rod, and its other end loosely surrounding said plunger and the other of said rods, means of resistance confined between said plunger and one end of said casing for opposing the distortion of said leaf spring, yieldable means confined between the other end of said casing and said plunger for absorbing the expansive movement of the plunger, said casing being bodily rotatable to adjust its position axially of the rods so as to vary the curvature of the leaf spring, and supplemental locking means connected to said threaded rod and engaging the outer adjacent end of said casing for maintaining the latter in axial adjusted position.

2. A vehicle shock absorber comprising, in combination, a leaf spring, two rods, respectively, connected to opposite ends of the leaf spring, one of said rods having a threaded end portion, and the other having a plunger connected thereto, a casing or barrel having one end engaging said threaded rod, and its other end loosely surrounding said plunger and the other of said rods, a variable means of resistance in the form of two coil springs having different torsional strength confined between said plunger and one end of the casing for absorbing normal and excessive shock imparted to the leaf spring, yieldable means confined between the other end of said casing and said plunger for absorbing the expansive movement of the plunger, said casing being bodily rotatable to adjust the axial length of the rods, and a nut connected to said threaded rod and engaging the outer adjacent end of said casing for maintaining the latter in axial adjusted position.

In witness whereof we affix our signatures:—

JOHN WILLIAM TURNER.
HARVEY WOOD.
EDGAR MANN.